United States Patent
Egawa (10) Patent No.: US 10,897,064 B2
(45) Date of Patent: Jan. 19, 2021

(54) NONAQUEOUS ELECTROLYTE SECONDARY CELL INCLUDING NEGATIVE ELECTRODE ACTIVE MATERIAL MADE OF AMORPHOUS-COATED GRAPHITE AND ELECTROLYTIC SOLUTION INCLUDING LITHIUM FLUOROSULFONATE

(71) Applicant: Toyota Jidosha Kabushiki Kaisha, Toyota (JP)

(72) Inventor: Kayo Egawa, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 107 days.

(21) Appl. No.: 16/269,856

(22) Filed: Feb. 7, 2019

(65) Prior Publication Data

US 2019/0252725 A1 Aug. 15, 2019

(30) Foreign Application Priority Data

Feb. 9, 2018 (JP) .................................. 2018-021947

(51) Int. Cl.
*H01M 10/0568* (2010.01)
*H01M 10/0525* (2010.01)
(Continued)

(52) U.S. Cl.
CPC ....... *H01M 10/0568* (2013.01); *H01M 4/366* (2013.01); *H01M 4/587* (2013.01);
(Continued)

(58) Field of Classification Search
CPC ......... H01M 10/0568; H01M 10/0525; H01M 4/366; H01M 4/587
(Continued)

(56) References Cited

U.S. PATENT DOCUMENTS

| 2012/0308881 A1 | 12/2012 | Tokuda et al. |
| 2013/0252093 A1 | 9/2013 | Yokomizo et al. |

(Continued)

FOREIGN PATENT DOCUMENTS

| JP | 2014232704 A | * 12/2014 |
| JP | 2016029668 A | 3/2016 |

(Continued)

OTHER PUBLICATIONS

U.S. Appl. No. 16/214,264, filed Dec. 10, 2018 Inventors: Kenta Ishii et al.

*Primary Examiner* — Sean P Cullen
(74) *Attorney, Agent, or Firm* — Dinsmore & Shohl LLP (57) ABSTRACT

A cell assembly before initial charging, including an electrode body having a positive electrode and a negative electrode, a nonaqueous electrolytic solution including a nonaqueous solvent and a supporting salt, and a case housing the electrode body and the nonaqueous electrolytic solution. The negative electrode has a negative electrode mixture layer including a particulate negative electrode active material made of amorphous-coated graphite in which the surface of graphite particles is coated with amorphous carbon, and the nonaqueous electrolytic solution includes lithium fluorosulfonate. The oil absorption amount of the negative electrode active material is 35 ml/100 g to 50 ml/100 g, and a weight proportion of the lithium fluorosulfonate in the nonaqueous electrolytic solution is 0.65 wt % to 0.85 wt %. As a result, it is possible to provide a high-performance nonaqueous electrolyte secondary cell in which both the high-rate characteristic and the Li precipitation resistance are realized at a high level.

2 Claims, 5 Drawing Sheets

(51) Int. Cl.
*H01M 4/587* (2010.01)
*H01M 4/36* (2006.01)
*H01M 4/02* (2006.01)

(52) U.S. Cl.
CPC .. *H01M 10/0525* (2013.01); *H01M 2004/027* (2013.01); *H01M 2300/004* (2013.01)

(58) Field of Classification Search
USPC .............................................. 429/199, 231.8
See application file for complete search history.

(56) References Cited

U.S. PATENT DOCUMENTS

| | | | |
|---|---|---|---|
| 2015/0104711 A1* | 4/2015 | Waki | H01M 4/133 429/231.8 |
| 2016/0226106 A1* | 8/2016 | Minami | H01M 10/049 |
| 2016/0276668 A1* | 9/2016 | Nagayama | H01M 4/13 |
| 2016/0380303 A1 | 12/2016 | Minami et al. | |

FOREIGN PATENT DOCUMENTS

| | | |
|---|---|---|
| JP | 2017010819 A | 1/2017 |
| KR | 20130143044 A | 12/2013 |

* cited by examiner

NONAQUEOUS ELECTROLYTE SECONDARY CELL INCLUDING NEGATIVE ELECTRODE ACTIVE MATERIAL MADE OF AMORPHOUS-COATED GRAPHITE AND ELECTROLYTIC SOLUTION INCLUDING LITHIUM FLUOROSULFONATE

CROSS REFERENCE TO RELATED APPLICATIONS

The present application claims priority to Japanese Patent Application No. 2018-21947 filed on Feb. 9, 2018, the entire contents of which are hereby incorporated by reference.

BACKGROUND

1. Technical Field

The present disclosure relates to a nonaqueous electrolyte secondary cell. More specifically, the present disclosure relates to a cell assembly in which an electrode body and a nonaqueous electrolytic solution are housed in a case before initial charging and to a nonaqueous electrolyte secondary cell obtained by initial charging of the cell assembly.

2. Description of the Related Art

In recent years, nonaqueous electrolyte secondary cells such as lithium ion secondary cells (hereinafter also simply referred to as "secondary cells") have been advantageously used as so-called portable power sources for personal computers and portable terminals and as power sources for driving vehicles. Among such secondary cells, a lithium ion secondary cell that is lightweight and capable of obtaining high energy density is of particularly high importance as a high-output power source to be used for vehicles such as electric vehicles and hybrid vehicles (for example, a power source for driving a motor connected to drive wheels of a vehicle).

Such a secondary cell is generally constructed by performing initial charging of a cell assembly in which an electrode body and a nonaqueous electrolytic solution are housed in a case. The electrode body includes a sheet-shaped positive electrode in which a positive electrode mixture layer is provided on the surface of a foil-shaped positive electrode current collector and a sheet-shaped negative electrode in which a negative electrode mixture layer is provided on the surface of a foil-shaped negative electrode current collector. Further, the nonaqueous electrolytic solution is prepared by dissolving a predetermined lithium salt (for example, $LiPF_6$) in a nonaqueous solvent (organic solvent). Japanese Patent Application Publication No. 2016-29668 discloses a technique of adding a fluorosulfonate such as $FSO_3Li$ to such a nonaqueous electrolytic solution.

SUMMARY

Amorphous-coated graphite in which the surface of graphite particles is coated with amorphous carbon has been studied for use as a negative electrode active material in such a nonaqueous electrolyte secondary cell. By using such amorphous-coated graphite, it is possible to suppress the deposition of electrolytic solution decomposition products, which can inhibit the occlusion/release of lithium ions, on the surface of the negative electrode active material, thereby making it possible to improve suitably the cell performance such as a high-rate characteristic (input/output characteristic).

However, in recent years, a strong demand has been created for high-performance nonaqueous electrolyte secondary cells capable of exhibiting various cell performances, including a high-rate characteristic at even higher levels. In particular, in the field of power sources for driving vehicles such as electric vehicles and hybrid vehicles, it is necessary that both the high-rate characteristic, which enables rapid charge and discharge, and Li precipitation resistance which prevents cell capacity from lowering even in long-term use be suitably realized at a high level.

The present disclosure has been accomplished to meet such requirements, and it is an object of the present disclosure to provide a high-performance nonaqueous electrolyte secondary cell in which both the Li precipitation resistance and the high-rate characteristic are suitably realized at a high level.

In order to achieve the above object, a cell assembly having the following configuration is provided as one aspect of the present disclosure.

As described above, a nonaqueous electrolyte secondary cell is constructed by performing initial charging (conditioning process) on a structure in which an electrode body and a nonaqueous electrolytic solution are housed in a case. A "battery assembly" in this specification refers to a structure before such initial charging.

The cell assembly disclosed herein is a cell assembly before initial charging, including an electrode body having a positive electrode and a negative electrode, a nonaqueous electrolytic solution including a nonaqueous solvent and a supporting salt, and a case housing the electrode body and the nonaqueous electrolytic solution. In such a cell assembly, the negative electrode has a negative electrode mixture layer including a particulate negative electrode active material made of amorphous-coated graphite in which the surface of graphite particles is coated with amorphous carbon, and the nonaqueous electrolytic solution includes lithium fluorosulfonate ($FSO_3Li$).

In the cell assembly disclosed herein, an oil absorption amount of the negative electrode active material is 35 ml/100 g to 50 ml/100 g, and a weight proportion of the lithium fluorosulfonate in the nonaqueous electrolytic solution is 0.65 wt % to 0.85 wt %.

The inventors of the present disclosure have conducted various experiments and studies in order to meet the above-mentioned requirements. As a result, it was found that when amorphous-coated graphite is used as a negative electrode active material, the high-rate characteristic of a nonaqueous electrolyte secondary cell can be further improved by lowering the oil absorption amount of the negative electrode active material. However, the use of amorphous-coated graphite having a low oil absorption amount results in a new problem that the Li precipitation resistance is deteriorated and the capacity retention ratio is lowered.

The inventors of the present disclosure have then conducted additional research under an assumption that where the deterioration of Li precipitation resistance when using the negative electrode active material made of amorphous-coated graphite having a low oil absorption amount could be suitably suppressed, it would be possible to suitably realize both the Li precipitation resistance and the high-rate characteristic at a high level.

As a result, it was found that where a nonaqueous electrolytic solution including an appropriate amount of lithium fluorosulfonate ($FSO_3Li$) is used, a decrease in capacity retention ratio is suppressed despite the use of amorphous-coated graphite having a low oil absorption amount. This makes it possible to prevent deterioration of Li precipitation resistance while maintaining excellent high-rate characteristic. The reason why such an effect can be obtained is presumed to be that the addition of an appropriate amount of $FSO_3Li$ stabilizes the nonaqueous electrolyte chemically and electrochemically and suppresses the decomposition of the nonaqueous electrolytic solution.

The cell assembly disclosed herein is based on the above-mentioned findings, and in the cell assembly, the oil absorption amount of the negative electrode active material made of amorphous-coated graphite is 35 ml/100 g to 50 ml/100 g and the weight proportion of $FSO_3Li$ in the nonaqueous electrolytic solution is 0.65 wt % to 0.85 wt %.

By using a negative electrode active material made of amorphous-coated graphite having such a low oil absorption amount, a high-rate characteristic can be improved. By using a nonaqueous electrolytic solution including $FSO_3Li$ at the weight proportion within the above numerical range, deterioration of Li precipitation resistance can be suitably prevented. Therefore, by using the cell assembly disclosed herein, it is possible to construct a high-performance nonaqueous electrolyte secondary cell in which both the high-rate characteristic and the Li precipitation resistance are suitably realized at a high level.

The "oil absorption amount of negative electrode active material" in the present specification is the oil absorption amount of linseed oil. Specifically, the oil absorption amount (mL/100 g) of linseed oil was measured in accordance with JIS K 6217-4 "Carbon black for rubber industry—Fundamental characteristics—Part 4: Determination of DBP absorption amount". Specifically, first, the reagent liquid in "Determination of DBP absorption amount" of the JIS standard is changed from DBP (dibutyl phthalate) to linseed oil. Next, a reagent liquid (linseed oil) is dropwise added with a constant-velocity burette to the test target powder (negative electrode active material), and a change in viscosity characteristic is measured with a torque detector. Then, the addition amount of the reagent liquid per unit weight of the test target powder corresponding to the torque of 70% of the generated maximum torque is obtained. This makes it possible to obtain "oil absorption amount of linseed oil".

In addition, in the present specification, the "graphite particle" means a particle including graphite (for example a particle composed of graphite). Further, "graphite" means a carbon material having a cubic crystal structure. Meanwhile, "amorphous carbon" means a carbon material having no crystal structure, and examples thereof include carbon black and activated carbon.

According to another aspect of the present disclosure, there is provided a nonaqueous electrolyte secondary cell having the following configuration.

The nonaqueous electrolyte secondary cell disclosed herein includes an electrode body having a positive electrode and a negative electrode, a nonaqueous electrolytic solution including a nonaqueous solvent and a supporting salt, and a case housing the electrode body and the nonaqueous electrolytic solution. In such a nonaqueous electrolyte secondary cell, the negative electrode has a negative electrode mixture layer including a particulate negative electrode active material made of amorphous-coated graphite in which the surface of graphite particles is coated with amorphous carbon, and a negative electrode SEI film including at least a fluorosulfonic acid skeleton is formed on the surface of the negative electrode active material.

In the nonaqueous electrolyte secondary cell disclosed herein, the oil absorption amount of the negative electrode active material is 35 ml/100 g to 50 ml/100 g, and the component amount $I_S$ of the fluorosulfonic acid skeleton in the negative electrode SEI film is 3.7 $\mu mol/m^2$ to 7.4 $\mu mol/m^2$.

The nonaqueous electrolyte secondary cell disclosed herein is constructed by performing initial charging on the cell assembly of the above-described aspect. Specifically, when initial charging is implemented on the cell assembly, a part of the nonaqueous electrolytic solution is decomposed and a negative electrode solid electrolyte interface (SEI) film is formed on the surface of the negative electrode active material. At this time, where a nonaqueous electrolytic solution including $FSO_3Li$ is used, a negative electrode SEI film derived from the $FSO_3Li$ is formed.

In the cell assembly of the aspect described above, $FSO_3Li$ of 0.65 wt % to 0.85 wt % is included in the nonaqueous electrolytic solution. When such a cell assembly is initially charged, a negative electrode SEI film derived from the $FSO_3Li$ is formed at 3.7 $\mu mol/m^2$ to 7.4 $\mu mol/m^2$. Since the nonaqueous electrolyte secondary cell having such a negative electrode SEI film is constructed by using the cell assembly of the above-described aspect, both the Li precipitation resistance and the high-rate characteristic are suitably realized at a high level and high cell performance can be demonstrated.

The above-mentioned "negative electrode SEI film derived from $FSO_3Li$" is defined in the present specification by "component amount ($I_S$) of fluorosulfonic acid skeleton". The "component amount ($I_S$) of fluorosulfonic acid skeleton" is a value ($\mu mol/m^2$) obtained by measuring the component amount of $FSO_3^-$ in the negative electrode by ion chromatography (IC) and normalizing by a BET specific surface area ($m^2$) of the negative electrode active material. The "BET specific surface area" is a value obtained by analyzing, by the BET method, a gas adsorption amount measured by a gas adsorption method (constant-capacity adsorption method) using nitrogen ($N_2$) gas as an adsorbate.

DETAILED DESCRIPTION

Hereinafter, an embodiment of the present disclosure will be described. In the drawings used for the following description, the same reference numerals are attached to the members/parts that exhibit the same action. The dimensional relationship (length, width, thickness, and the like) in each drawing does not reflect the actual dimensional relationship. In addition, matters other than matters particularly referred to in the present specification for the implementation of the present disclosure (for example, the case, electrode terminal structure, and the like) can be understood as design matters for a person skilled in the art which are based on the related art in the pertinent technical field.

In the present specification, the expression "range of A to B" means A or more and B or less.

1. Battery Assembly

Figure 1:
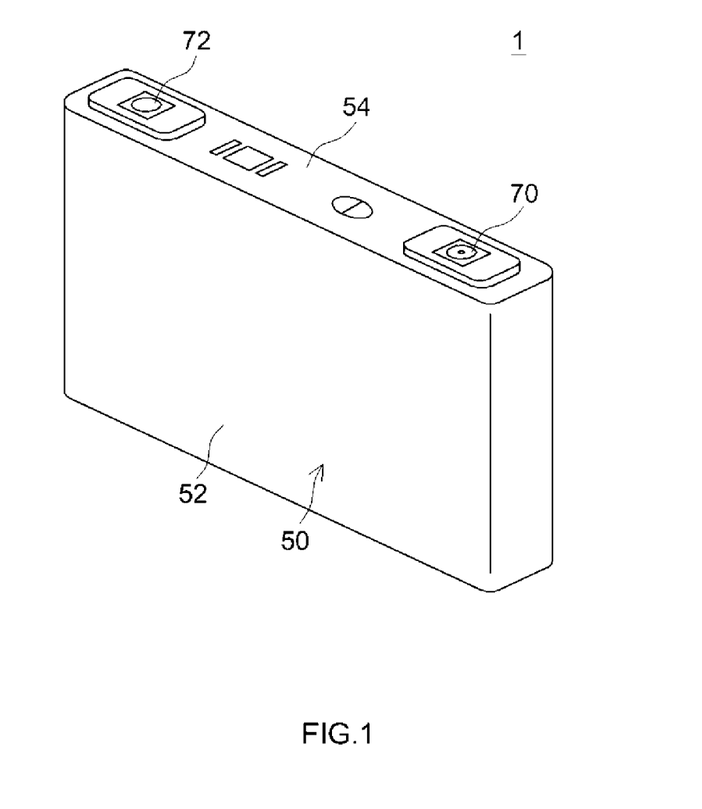
FIG. 1 is a perspective view schematically showing a cell assembly according to one embodiment of the present disclosure.
Figure 2:
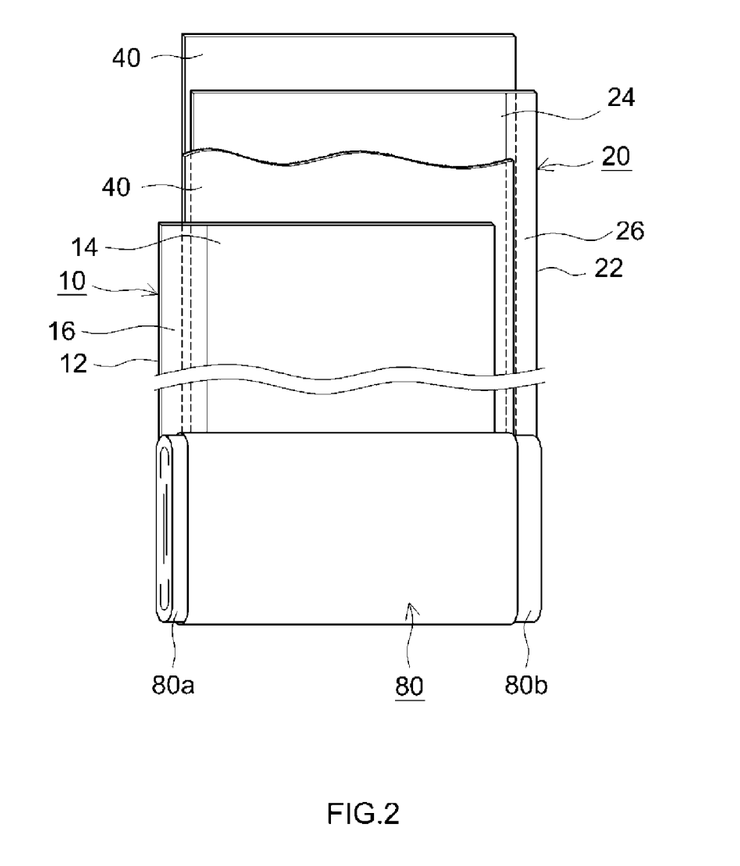
FIG. 2 is a perspective view schematically showing an electrode body in an embodiment of the present disclosure.

Hereinafter, a lithium ion secondary cell, that is, a cell assembly of a lithium ion secondary cell before initial charging (conditioning process) will be described as one embodiment of the present disclosure. FIG. 1 is a perspective view schematically showing a cell assembly according to this embodiment. FIG. 2 is a perspective view schematically showing an electrode body in this embodiment.

(1) Case

As shown in FIG. 1, a cell assembly 1 according to the present embodiment includes a flat rectangular case 50. This case 50 is configured of a flat case main body 52 with an open upper surface and a lid member 54 which closes the opening in the upper surface. A positive electrode terminal 70 and a negative electrode terminal 72 are provided on the lid member 54 forming the upper surface of the case 50.

(2) Electrode Body

In the cell assembly 1 according to the present embodiment, the electrode body 80 shown in FIG. 2 is housed in the case 50 described above. The electrode body 80 includes a positive electrode 10, a negative electrode 20, and a separator 40. The positive electrode 10 and the negative electrode 20 are opposed to each other with the separator 40 interposed therebetween.

The electrode body 80 shown in FIG. 2 is a wound electrode body formed by winding a laminate in which the positive electrode 10 and the negative electrode 20 are laminated with the separator 40 interposed therebetween. However, the electrode body used for the nonaqueous electrolyte secondary cell (cell assembly) disclosed herein is not particularly limited as long as it has a positive electrode and a negative electrode. Another example of such an electrode body is a laminated electrode body obtained by laminating a plurality of positive electrodes and negative electrodes with a separator interposed therebetween.

Each member constituting the electrode body 80 will be specifically described below.

(a) Positive Electrode

As shown in FIG. 2, the positive electrode 10 is formed by applying a positive electrode mixture layer 14 to the surface (for example, both surfaces) of a positive electrode current collector 12. In addition, a current collector exposed portion 16 to which the positive electrode mixture layer 14 is not applied is formed on one side edge portion of the positive electrode 10. A positive electrode connecting portion 80a around which the current collector exposed portion 16 is wound is formed on one side edge portion of the electrode body 80. A positive electrode terminal 70 (see FIG. 1) is connected to the positive electrode connecting portion 80a. An aluminum foil or the like is used for the positive electrode current collector 12.

Further, the positive electrode mixture layer 14 includes a particulate positive electrode active material. This positive electrode active material is composed of a lithium composite oxide capable of occluding and releasing lithium ions. A lithium composite oxide (lithium transition metal composite oxide) including one or more transition metal elements is used as the positive electrode active material. Examples of such lithium transition metal composite oxide include lithium nickel composite oxide, lithium nickel cobalt composite oxide, lithium nickel cobalt manganese composite oxide, and the like.

The positive electrode mixture layer 14 may include an additive other than the above-described positive electrode active material. Examples of such an additive include a conductive material and a binder. For example, a carbon material such as graphite or a carbon black material such as acetylene black (AB) can be suitably used as the conductive material. As the binder, for example, polyvinylidene fluoride (PVdF), polyvinylidene chloride (PVdC), polyethylene oxide (PEO), or the like can be used.

(b) Negative Electrode

As shown in FIG. 2, the negative electrode 20 is formed by applying a negative electrode mixture layer 24 to the surface (for example, both surfaces) of a negative electrode current collector 22. A current collector exposed portion 26 to which the negative electrode mixture layer 24 is not applied is formed on one side edge portion of the negative electrode 20. A negative electrode connecting portion 80b around which the current collector exposed portion 26 is wound is formed on one side edge portion of the electrode body 80. A negative electrode terminal 72 (see FIG. 1) is connected to the negative electrode connecting portion 80b. A copper foil or the like is used for the negative electrode current collector 22.

Further, the negative electrode mixture layer 24 includes a particulate negative electrode active material. This negative electrode active material is composed of a carbon material capable of occluding and releasing lithium ions. In the present embodiment, amorphous-coated graphite is used as the carbon material for such a negative electrode active material. This amorphous-coated graphite is formed by coating the surface of particulate natural graphite with amorphous carbon (carbon black, activated carbon, and the like). Such an amorphous-coated graphite contributes to improvement of high-rate characteristic (input/output characteristic) and the like since the deposition of electrolytic solution decomposition products, which can inhibit the occlusion/release of lithium ions, on the surface of the negative electrode active material can be suppressed.

In addition, the negative electrode mixture layer 24 may include an additive other than the negative electrode active material. Examples of such an additive include a binder and a thickener. For example, polyvinylidene fluoride (PVDF), styrene butadiene rubber (SBR), or the like can be used as the binder. As the thickener, for example, carboxymethyl cellulose (CMC) or the like can be used.

Further, in the cell assembly 1 according to the present embodiment, the oil absorption amount of the above-described negative electrode active material is adjusted within the range of 35 ml/100 g to 50 ml/100 g, or even 40 ml/100 g to 50 ml/100 g, for example about 45 ml/100 g. As will be described in detail hereinbelow, by adjusting the oil absorption amount of the negative electrode active material composed of amorphous-coated graphite to 35 ml/100 g or more, it is possible to further improve greatly the high-rate characteristic. In addition, when the oil absorption amount of the negative electrode active material exceeds 50 ml/100 g, there is a possibility that the degree of decrease in Li precipitation resistance will increase or the production of a cell will become difficult. In consideration of these points, the oil absorption amount of the negative electrode active material is adjusted within the above-mentioned range.

In the cell assembly 1 according to the present embodiment, the BET specific surface area of the negative electrode active material is 3.0 m$^2$/g to 6.0 m$^2$/g, or even 3.5 m$^2$/g to 5.0 m$^2$/g, for example 4.0 m$^2$/g. When the BET specific surface area of the negative electrode active material is increased, the reaction resistance at the negative electrode 20 is lowered to improve the high-rate characteristic, but the electrolytic solution tends to be decomposed and the Li precipitation resistance may be lowered. In consideration of this point, the BET specific surface area of the negative electrode active material 28 may be adjusted within the above-mentioned range.

(c) Separator

The separator 40 is disposed between the positive electrode 10 and the negative electrode 20. The separator 40 is a porous insulating sheet in which a plurality of fine holes (pore diameter: about 0.01 μm to 6 μm) through which charge carriers (lithium ions) pass is formed. For example, an insulating resin such as polyethylene (PE), polypropylene (PP), a polyester, a polyamide, or the like can be used as the separator 40. The separator 40 may be a laminated sheet obtained by laminating two or more of the above-described resins. The thickness of the separator 40 is, for example, 5 μm to 40 μm, 10 μm to 30 μm, or even 15 μm to 25 μm. Further, a heat resistance layer (HRL) including a metal oxide such as alumina ($Al_2O_3$) may be formed on the surface of the separator 40.

(3) Nonaqueous Electrolytic Solution

Although not shown, in the cell assembly 1 according to the present embodiment, a nonaqueous electrolytic solution including a supporting salt in an organic solvent (nonaqueous solvent) is housed in the case 50 (see FIG. 1). Hereinafter, the composition of the nonaqueous electrolytic solution in this embodiment will be described.

(a) Nonaqueous Solvent

For example, various organic solvents (for example, saturated cyclic carbonates, linear carbonates, linear carboxylic acid esters, cyclic carboxylic acid ester, ether compounds, sulfone compounds, and the like) used for a conventional lithium ion secondary cell can be used without particular limitation as the nonaqueous solvent. These organic solvents may be used singly or in combination of two or more thereof.

Among such nonaqueous solvents, examples of saturated cyclic carbonates include ethylene carbonate, propylene carbonate, butylene carbonate, and the like. Examples of linear carbonates include dimethyl carbonate, diethyl carbonate, ethyl methyl carbonate, di-n-propyl carbonate, and the like. Examples of linear carboxylic acid esters include methyl acetate, ethyl acetate, n-propyl acetate, n-butyl acetate, and the like. Examples of cyclic carboxylic acid esters include gamma butyrolactone, gamma valerolactone, gamma caprolactone, epsilon caprolactone, and the like. Examples of ether compounds include diethyl ether, di(2-fluoroethyl) ether, di(2,2-difluoroethyl) ether, and the like. Examples of sulfone compounds include 2-methylsulfolane, 3-methylsulfolane, 2-fluorosulfolane, 3-fluorosulfolane, and the like.

(b) Supporting Salt

The supporting salt is used as a main electrolyte. For this supporting salt, for example, lithium salts such as $LiPF_6$, $LiBF_4$, $LiClO_4$, and the like are suitably used. The amount of such a supporting salt is not particularly limited so long as it does not significantly impair the effect of the present embodiments. Specifically, when $LiPF_6$ is used as the supporting salt, the lower limit of the molar amount of $LiPF_6$ is 0.5 mol/L or more, 0.6 mol/L or more, or even 0.7 mol/L or more. The upper limit of the molar amount of $LiPF_6$ is 3.0 mol/L or less, 2.0 mol/L or less, or even 1.5 mol/L or less. The range of the amount of $LiPF_6$ is 0.5 mol/L or more and 3.0 mol/L or less, 0.5 mol/L or more and 2.0 mol/L or less, or even 0.5 mol/L or more and 1.5 mol/L or less.

When the amount of $LiPF_6$ is within the above range, the total ion amount in the nonaqueous electrolytic solution and the viscosity of the electrolytic solution can be appropriately balanced. As a result, the input/output characteristic can be more suitably improved without excessively lowering the ionic conductivity.

(c) Lithium Fluorosulfonate ($FSO_3Li$)

As described above, in the cell assembly 1 according to the present embodiment, lithium fluorosulfonate ($FSO_3Li$) is included in the nonaqueous electrolytic solution. Adding $FSO_3Li$ to the nonaqueous electrolytic solution makes it possible to chemically and electrochemically stabilize the nonaqueous electrolytic solution and suppress decomposition of the nonaqueous electrolytic solution. As a result, it is possible to improve Li precipitation resistance and to prevent a decrease in capacity retention ratio. However, when the addition amount of $FSO_3Li$ to the nonaqueous electrolytic solution is excessively increased, the lithium concentration in the secondary electrolyte is increased and the amount of lithium (surplus lithium) not involved in the charge-discharge reaction is increased, so that the high-rate characteristic may degrade. Therefore, in the present embodiment, the mass of $FSO_3Li$ relative to the total mass of the nonaqueous electrolytic solution is set to 0.65 wt % to 0.85 wt %, or even 0.7 wt % to 0.8 wt %, for example, about 0.74 wt %. As a result, it is possible to suitably improve the Li precipitation resistance (capacity retention ratio) without lowering the high-rate characteristic.

(4) Weight Proportion of $FSO_3Li$ and Oil Absorption Amount of Negative Electrode Active Material As described above, in the cell assembly 1 according to the present embodiment, the weight proportion of $FSO_3Li$ in the nonaqueous electrolytic solution is adjusted to 0.65 wt % to 0.85 wt %, and the oil absorption amount of the negative electrode active material is adjusted to 35 ml/100 g to 50 ml/100 g.

Here, in the cell assembly 1 according to the present embodiment, the oil absorption amount of the negative electrode active material made of amorphous-coated graphite is adjusted to a comparatively low range of 35 ml/100 g to 50 ml/100 g. Generally, a negative electrode active material having such a low oil absorption amount greatly improves the high-rate characteristic, but it may cause a decrease in capacity retention ratio due to deterioration of Li precipitation resistance. However, in the present embodiment, since the nonaqueous electrolytic solution having the weight proportion of $FSO_3Li$ of 0.65 wt % to 0.85 wt % is used, deterioration of Li precipitation resistance can be suitably prevented while maintaining the high-rate characteristic in a high state. As described above, with the cell assembly 1 of the present embodiment, the disadvantages due to the use of the negative electrode active material made of amorphous-coated graphite having a low oil absorption amount and the nonaqueous electrolyte solution including $FSO_3Li$ are mutually compensated. As a result, it is possible to construct a high-performance lithium ion secondary cell in which both the high-rate characteristic and the Li precipitation resistance are suitably realized at a high level.

2. Lithium Ion Secondary Cell

Next, as another embodiment of the present disclosure, a lithium ion secondary cell constructed using the cell assembly 1 according to the above-described embodiment will be described.

The lithium ion secondary cell according to the present embodiment is constructed by performing initial charging on the cell assembly 1 according to the above-described embodiment. Therefore, the lithium ion secondary cell according to the present embodiment has high cell performance such that both the high-rate characteristic and the Li precipitation resistance are realized at a high level, and the cell can be suitably used as a high-output power source for vehicles and the like.

Although not particularly limited, constant-current and constant-voltage charging (CC-CV charging) of the following procedure is carried out in the initial charging when constructing a lithium ion secondary cell. First, in an ambient temperature environment (for example, 25° C.), constant-current charging at about 0.1 C to 10 C is performed until an inter-terminal voltage between the positive electrode terminal 70 and the negative electrode terminal 72 reaches 2.5 V to 4.2 V, or even 3.0 V to 4.1 V. Then, the cell is constant-voltage charged until the state of charge (SOC) reaches about 60% to 100% (typically about 80% to 100%).

Figure 3:
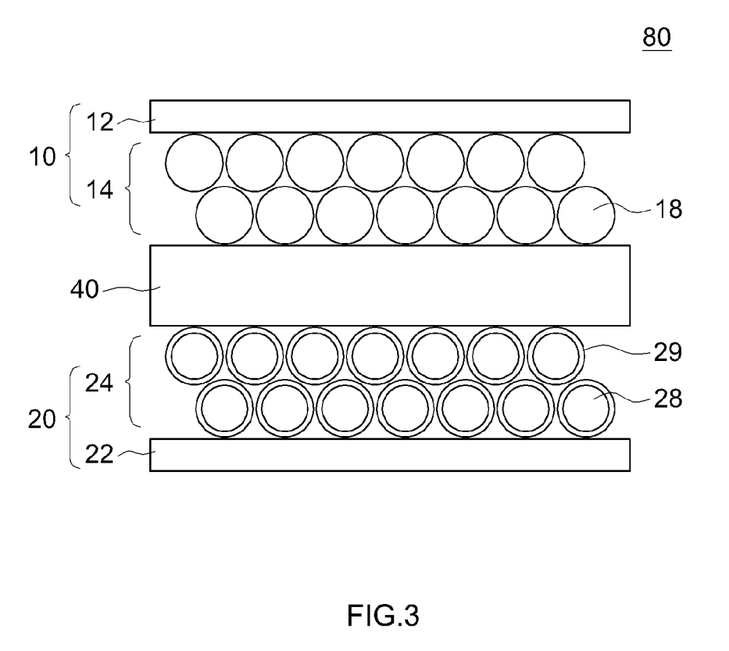
FIG. 3 is a schematic diagram illustrating positive and negative electrodes of a lithium ion secondary cell according to an embodiment of the present disclosure.

FIG. 3 shows a schematic diagram for explaining the states of the positive and negative electrodes of the lithium ion secondary cell constructed by the above-described initial charging. As shown in FIG. 3, in the electrode body 80 of the lithium ion secondary cell according to the present embodiment, the positive electrode 10 and the negative electrode 20 face each other with the separator 40 interposed therebetween. As described in the above embodiment, the positive electrode 10 includes the foil-shaped positive electrode current collector 12 and the positive electrode mixture layer 14 including the particulate positive electrode active material 18. Further, the negative electrode 20 includes the foil-shaped negative electrode current collector 22 and the negative electrode mixture layer 24 including the particulate negative electrode active material 28.

In this lithium ion secondary cell, a negative electrode SEI film 29 is formed on the surface of the negative electrode active material 28. The negative electrode SEI film 29 is formed as a result of decomposition of a part of the nonaqueous electrolytic solution at the time of initial charging. Here, in the present embodiment, since the nonaqueous electrolytic solution includes $FSO_3Li$, the negative electrode SEI film 29 formed by the initial charging includes the fluorosulfonic acid skeleton component ($FSO_3^-$) derived from $FSO_3Li$. More specifically, the lithium ion secondary cell according to the present embodiment is constructed by performing initial charging of a cell assembly using a nonaqueous electrolytic solution including 0.65 wt % to 0.85 wt % of $FSO_3Li$. In the lithium ion secondary cell thus constructed, the component amount $I_S$ of the fluorosulfonic acid skeleton of 3.7 µmol/m² to 7.4 µmol/m² is included in the negative electrode SEI film 29.

Test Example

Hereinafter, a test example relating to the present disclosure will be described, but the description of the test example is not intended to limit the present disclosure.

1. Samples 1 to 7

In this test example, seven types of cell assemblies were prepared that differed from each other in the oil absorption amount (ml/100 g) of the negative electrode active material and the weight proportion (wt %) of $FSO_3Li$ in the nonaqueous electrolyte. Then, the cell assemblies were subjected to initial charging to prepare lithium ion secondary cells of Samples 1 to 7. Specific manufacturing conditions will be described below.

In the test example, first, lithium nickel cobalt manganese composite oxide ($Li_{1+x}Ni_{1/3}Co_{1/3}Mn_{1/3}O_2$) was used as the positive electrode active material, and the positive electrode active material, a conductive material (acetylene black: AB), and a binder (polyvinylidene fluoride: PVdF) were mixed at a ratio of 91:6:3. Next, this mixture was dispersed in a dispersion medium (N-methylpyrrolidone: NMP) to prepare a positive electrode mixture paste. Then, the positive electrode mixture paste was applied to both surfaces of a positive electrode current collector (aluminum foil) and dried, and then rolled with a roll press machine to prepare a sheet-shaped positive electrode.

Next, in this test example, amorphous-coated graphite (BET specific surface area: 4.0 m²/g) in which the surface of particulate natural graphite was coated with amorphous carbon was used as a negative electrode active material. Then, the negative electrode active material, a thickener (carboxymethyl cellulose: CMC) and a binder (styrene butadiene rubber: SBR) were mixed at a ratio of 98:1:1 and dispersed in a dispersion medium (ion exchanged water) to prepare a negative electrode mixture paste. Then, the negative electrode mixture paste was applied to both sides of a negative electrode current collector (copper foil) and dried, and then rolled with a roll press machine to prepare a sheet-shaped negative electrode.

In this test example, the oil absorption amount of the negative electrode active material (amorphous-coated graphite) was made different for each sample. The specific oil absorption amount of each sample is shown in Table 1 below.

Next, the positive electrode and the negative electrode produced as described above were laminated with a sheet-shaped separator interposed therebetween, and the laminate was then wound/pressed to produce a flat wound electrode body. Then, the produced wound electrode body was connected to electrode terminals (positive electrode terminal and negative electrode terminal) and then housed inside a case. The separator used in this test example is a three-layer (PP/PE/PP) separator in which a polyethylene (PE) layer is sandwiched between two layers of polypropylene (PP).

Next, a nonaqueous electrolytic solution in which a supporting salt ($LiPF_6$) was contained at a concentration of about 1 mol/L in a nonaqueous solvent including ethylene carbonate (EC), dimethyl carbonate (DMC) and ethyl methyl carbonate (EMC) at a volume ratio of 3:4:3 was impregnated in the case.

Here, in this test example, lithium fluorosulfonate ($FSO_3Li$) was dissolved in the nonaqueous electrolytic solution. The weight proportion of dissolved $FSO_3Li$ is different for each sample. Specific values of the weight proportion of $FSO_3Li$ of each sample are shown in Table 1 below.

Next, after the cell assembly was constructed by welding the case body and the lid member, the cell assembly was subjected to initial charging to produce a lithium ion secondary cell for testing. In the initial charging in this test example, the constructed cell assembly was placed in an environment of 25° C., charged with a constant current of 1 C until the voltage between the positive and negative terminals reached 4.1 V, and then charged at a constant voltage (CV) until the current value reached 1/50 C to reach a fully charged state (SOC 100%).

2. Evaluation Tests (1) Component Analysis of SEI Film

Each of the lithium ion secondary cells of Samples 1 to 7 described above was discharged until the inter-terminal voltage reached 3 V (state of SOC 0%). The cell case was then disassembled and the negative electrode was taken out. Then, the removed negative electrode was washed with ethyl methyl carbonate (EMC) and then cut to a size of 17 mm×17 mm, thereby preparing a sample for analysis.

Ion chromatography (IC) was performed on the sample for analysis of the negative electrode, and the component amount of $FSO_3^-$ (component amount $I_S$ of the fluorosulfonic acid skeleton) present in the negative electrode was measured. The measurement results are shown in Table 1.

(2) High-rate Resistance Evaluation

Next, in order to evaluate the high-rate resistance of the lithium ion secondary cell of each sample, the resistance increase ratio (%) was measured. Specifically, after adjusting the SOC of each sample cell to 60%, a high-rate pulse cycle test was conducted in which a charge/discharge cycle consisting of the following (I) and (II) was repeated 3000 times. The resistance increase ratio (=[IV resistance after high-rate pulse cycle test/initial IV resistance]×100) was calculated based on the IV resistance after the high-rate pulse cycle test and the initial IV resistance. The IV resistance was obtained from the slope of the first order approximation line of the current (I)—voltage (V) plotted values when a 10-sec discharge was performed at 10 C.

Figure 4:
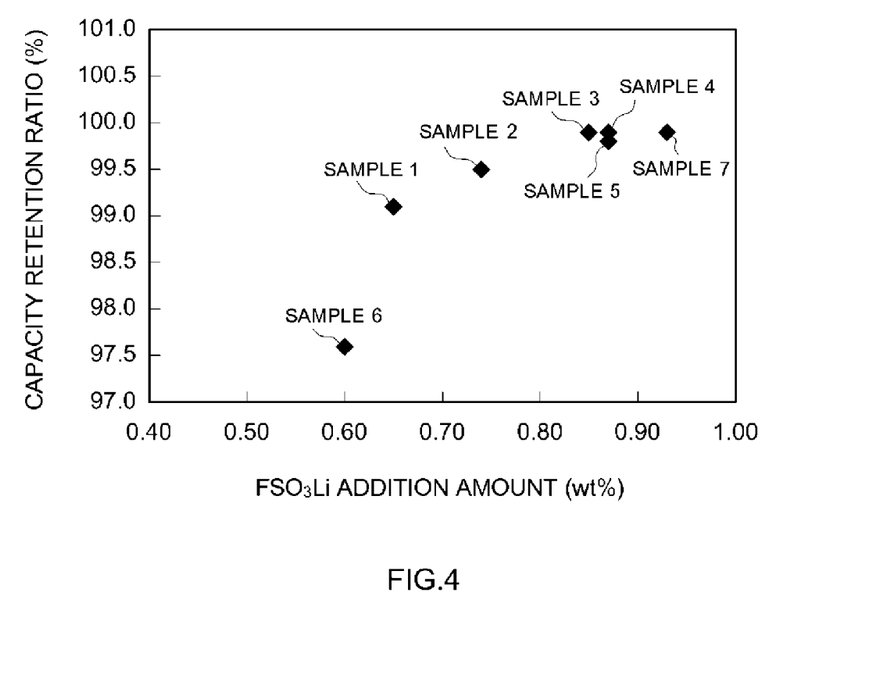
FIG. 4 is a graph showing measurement results of capacity retention ratio (%) of Samples 1 to 7.

The results are shown in Table 1 and FIG. 4.

(I) Charging for 10 sec with a constant current of 10 C (40 A).

(II) Discharging for 400 sec with a constant current of 2 C (8 A).

(3) Evaluation of Li Precipitation Resistance

In this test example, the capacity retention ratio was measured in order to evaluate the Li precipitation resistance of the cell of each sample. Specifically, for a cell of each sample, 1000 cycles of SOC 10% to 90% charge and discharge were performed under a 60° C.-temperature environment and a 2 C condition. Then, constant-current (CC) charging was carried out under a 60° C.-temperature environment and a 2 C condition, and the cell capacity after 1000 cycles was thereafter measured. Then, the ratio of the capacity after 1000 cycles to the capacity at the time of initial charge was calculated as the capacity retention ratio. The results are shown in Table 1 and FIG. 5.

TABLE 1

| Sample | Oil absorption amount of carbon material (ml/g) | $FSO_3Li$ concentration (wt %) | $FSO_3$ skeleton component amount Is ($\mu mol/m^2$) | Resistance increase ratio (%) | Capacity retention ratio (%) |
|---|---|---|---|---|---|
| 1 | 0.352 | 0.65 | 3.7 | 1.11 | 99.1 |
| 2 | 0.458 | 0.74 | 5.8 | 1.09 | 99.5 |
| 3 | 0.497 | 0.85 | 7.4 | 1.11 | 99.9 |
| 4 | 0.343 | 0.87 | 7.2 | 1.14 | 99.9 |
| 5 | 0.512 | 0.87 | 7.6 | 1.15 | 99.8 |
| 6 | 0.544 | 0.60 | 3.2 | 1.16 | 97.6 |
| 7 | 0.454 | 0.93 | 7.9 | 1.17 | 99.9 |

Figure 5:
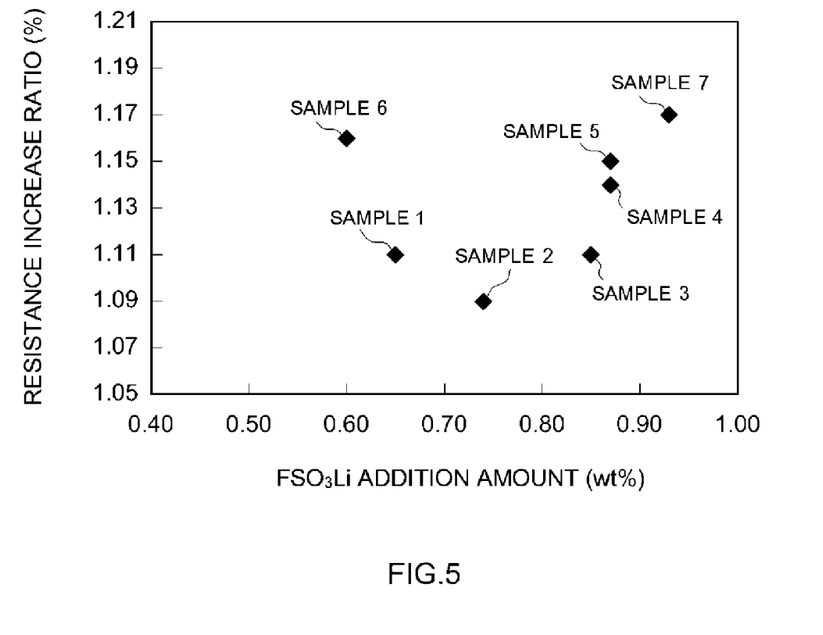
FIG. 5 is a graph showing measurement results of resistance increase rate (%) of Samples 1 to 7.

As shown in Table 1 and FIGS. 4 and 5, in the lithium ion secondary cells of Samples 1 to 3, the resistance increase rate was suppressed to as low as 1.11% or less, and a high capacity retention ratio 99.1% or more was obtained. From this, it was confirmed that by setting the weight proportion of $FSO_3Li$ in the nonaqueous electrolytic solution to 0.65 wt % to 0.85 wt % and setting the oil absorption amount of the negative electrode active material made of amorphous-coated graphite to 35 ml/100 g to 50 ml/100 g, it is possible to construct a high-performance lithium ion secondary cell in which both the high-rate characteristic and the Li precipitation resistance are realized at a high level.

Further, as shown in Table 1 above, it was confirmed that when the weight proportion of $FSO_3Li$ in the nonaqueous electrolytic solution is set to 0.65 wt % to 0.85 wt %, a negative electrode SEI film having a component amount $I_S$ of a fluorosulfonic acid skeleton of 3.7 $\mu mol/m^2$ to 7.4 $\mu mol/m^2$ is formed on the surface of the negative electrode active material after initial charge.

Although the present disclosure has been described in detail, the embodiments are merely exemplary, and the disclosure disclosed herein is inclusive of various modifications and changes of the above-described specific examples.

What is claimed is:

1. A cell assembly before initial charging, comprising an electrode body having a positive electrode and a negative electrode, a nonaqueous electrolytic solution including a nonaqueous solvent and a supporting salt, and a case housing the electrode body and the nonaqueous electrolytic solution, wherein the negative electrode has a negative electrode mixture layer including a particulate negative electrode active material made of amorphous-coated graphite in which the surface of graphite particles is coated with amorphous carbon;

the nonaqueous electrolytic solution includes lithium fluorosulfonate ($FSO_3Li$); and an oil absorption amount of the negative electrode active material is 35 ml/100 g to 50 ml/100 g, and a weight proportion of the lithium fluorosulfonate in the nonaqueous electrolytic solution is 0.65 wt % to 0.85 wt %.

2. A nonaqueous electrolyte secondary cell comprising an electrode body having a positive electrode and a negative electrode, a nonaqueous electrolytic solution including a nonaqueous solvent and a supporting salt, and a case housing the electrode body and the nonaqueous electrolytic solution, wherein the negative electrode has a negative electrode mixture layer including a particulate negative electrode active material made of amorphous-coated graphite in which the surface of graphite particles is coated with amorphous carbon;

a negative electrode SEI film including at least a fluorosulfonic acid skeleton is formed on the surface of the negative electrode active material; and an oil absorption amount of the negative electrode active material is 35 ml/100 g to 50 ml/100 g, and a component amount $I_S$ of the fluorosulfonic acid skeleton in the negative electrode SEI film is 3.7 $\mu mol/m^2$ to 7.4 $\mu mol/m^2$.

* * * * *